(12) United States Patent
Stöckli et al.

(10) Patent No.: US 6,216,542 B1
(45) Date of Patent: Apr. 17, 2001

(54) MONOLITHIC FORCE SENSOR

(75) Inventors: Roland Stöckli, Eqjiswil; Kaspar Saner, Döbendorf, both of (CH)

(73) Assignee: K-Tron Technologies Inc., Wilmington, DE (US)

( * ) Notice: Subject to any disclaimer, the term of this patent is extended or adjusted under 35 U.S.C. 154(b) by 0 days.

(21) Appl. No.: 09/230,687

(22) PCT Filed: May 11, 1998

(86) PCT No.: PCT/CH98/00191

§ 371 Date: Jul. 12, 1999

§ 102(e) Date: Jul. 12, 1999

(87) PCT Pub. No.: WO98/37387

PCT Pub. Date: Aug. 27, 1998

(30) Foreign Application Priority Data

May 28, 1997 (CH) .................................... 1261/97

(51) Int. Cl.[7] ...................................... G01B 7/16
(52) U.S. Cl. ........................................ 73/774; 73/862.392
(58) Field of Search .......................... 73/763, 767, 769, 73/774, 855, 862.328, 862.392

(56) References Cited

U.S. PATENT DOCUMENTS

| | | | |
|---|---|---|---|
| 4,079,624 | * 3/1978 | Kurtz | 73/862.625 |
| 4,103,758 | * 8/1978 | Trulio et al. | 181/121 |
| 4,409,789 | * 10/1983 | Hansen et al. | 60/384 |
| 5,053,703 | * 10/1991 | Fischer | 324/230 |
| 5,259,253 | 11/1993 | Wirth . | |
| 5,379,653 | 1/1995 | Saner . | |
| 5,408,894 | * 4/1995 | Henson | 73/866.5 |
| 5,496,973 | 3/1996 | Wirth . | |
| 5,501,177 | * 3/1996 | Edstrom, Sr. et al. | 119/72.5 |

FOREIGN PATENT DOCUMENTS

| | | |
|---|---|---|
| 071 652 | 8/1981 | (EP) . |
| 248 226 | 5/1987 | (EP) . |
| 325 619 | 3/1988 | (EP) . |
| 319 176 | 11/1988 | (EP) . |
| 544 858 | 6/1992 | (EP) . |
| 540 474 | 10/1992 | (EP) . |

* cited by examiner

*Primary Examiner*—Max Noori
(74) *Attorney, Agent, or Firm*—Ratner & Prestia

(57) ABSTRACT

The invention relates to an internal parallel motion force sensor containing a rectangular box load body fixedly connected to a measuring transducer and an electronic evaluation unit in a gas and humidity tight manner. The load body has an axal longitudinal bore hole on one of its halves. On the other half it has a hollow bore hole coaxial thereto and which is approximately the same length, leaving a rod-shaped lever. Two identical notches in the middle of the load body are fitted with two flat parallel-moving spiral springs in two opposite lying outer surfaces. A membrane is located between the bore holes, the notches and two other notches. Said membrane acts as an elastic joint for the lever. Deformation of the load body by identical opposing forces is transmitted to the lever by the spiral springs, converted into an electric signal by the measuring transducer on the open end thereof and transmitted by the evaluation unit in digital form.

13 Claims, 4 Drawing Sheets

MONOLITHIC FORCE SENSOR

The present invention relates to force sensors with internal parallel motion and a measuring transducer, which generates a digital signal from the force to be measured, or one derived from it by reduction. Some such force sensors are known, as for instance from EP 0 325 619 (D1) and EP 0 544 858 (D2). Furthermore, cord measuring transducers are known, for instance from EP 0 540 474 (D3).

The force sensors known from D1 and D2 are both suitable as surface loading measurement devices, since internal parallel motions are present. An elastic force reduction is a component of the force sensors in both cases. In both cases, however, the measurement transducers are built into the force sensors as separate elements with in part expensive and sensitive force transmission elements. Moisture and gas tight production of the measurement transducers used in D1 and D2, however, throw up technical problems, since as a general rule such versions are of relatively large construction and bring further force reductions with them. Further, from EP 319 176 a sealed version of a wobble pin is known, with integrated measurement electronics.

In any case, a wobble pin is basically constructed for point loading and cannot be immediately converted for surface loading.

The aim, which is to be addressed by the present invention, comprises producing a small size surface loading force sensor with integral parallel motion and force reduction in a moisture and gas tight construction. The addressing of the aim is reproduced in claim 1 with regard to its essential characteristics, in claims 2 to 17 regarding further advantageous versions.

The general concept of the invention is explained using the attached drawings. Shown are FIG. 1 a longitudinal section through a first example of construction of a force sensor, FIG. 2 a first cross section on AA, FIG. 3 a second cross section on BB, FIG. 4 a third cross section on CC, FIG. 5 a longitudinal section through the load body under load, FIG. 6 a longitudinal section through a second example of construction of a force sensor, FIG. 7 a first perspective view of the force sensor, FIG. 8 a second perspective view of the force sensor, and FIG. 9 a longitudinal section through a second example of a force sensor constructed in accordance with the present invention.

Figure 1:
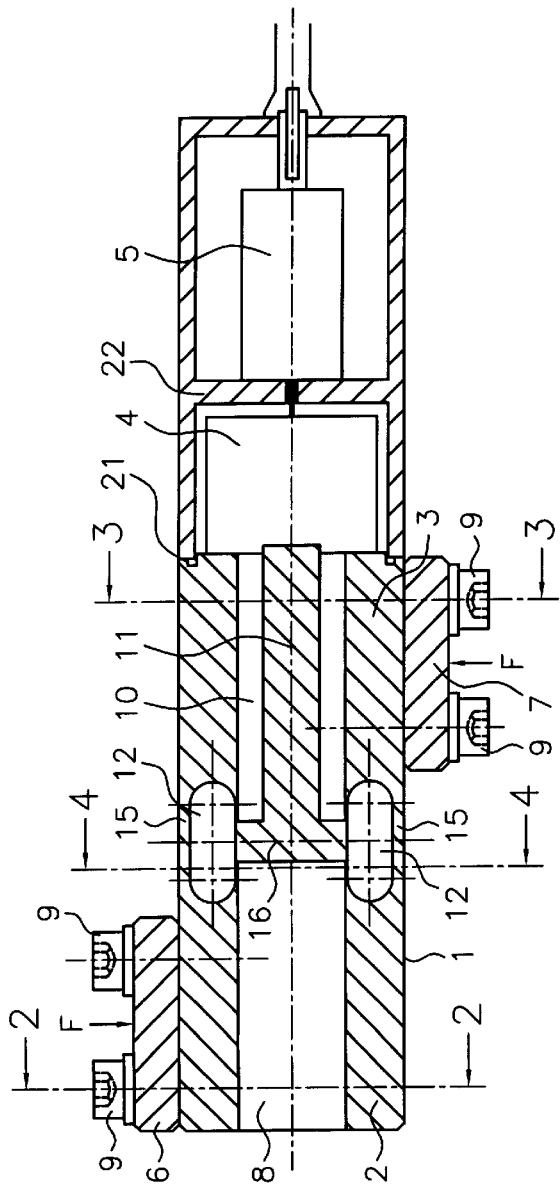
Figure 2:
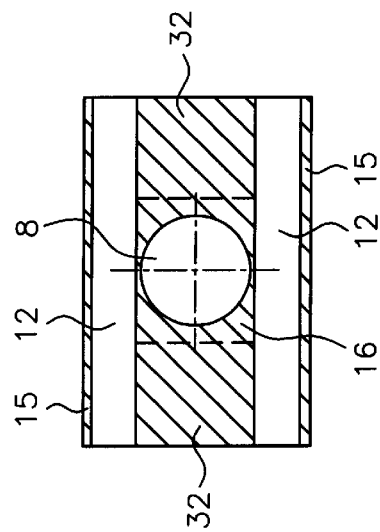
Figure 3:
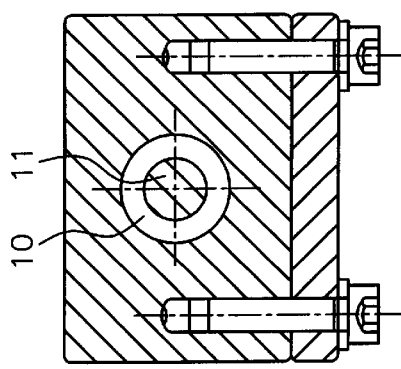
Figure 6:
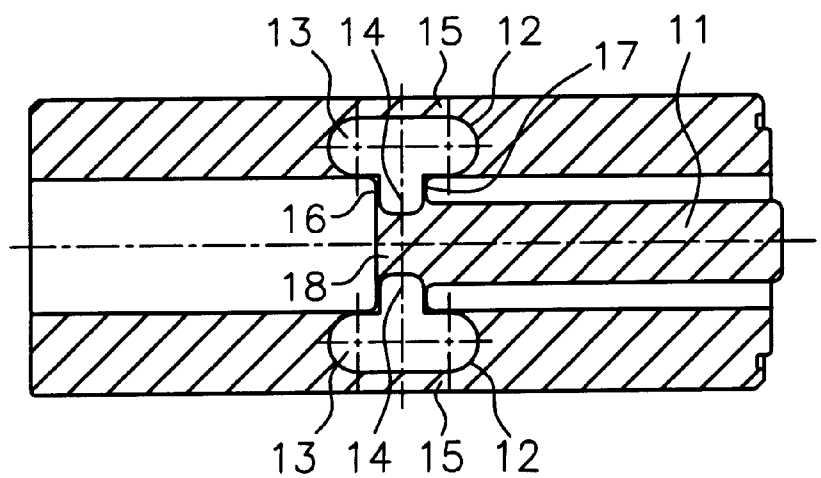

FIG. 1 shows a first example of construction of a force sensor according to the invention. It is constructed from a load body 1, a measurement transducer 4 and associated evaluation electronics 5. The load body 1 is itself divided into a load bearer 2 and a base 3; the last two elements are provided with a plate 6 or 7, which serve to introduce the force F to be measured. The positions at which the plates 6, 7 are fastened, for instance using screws 9 to the load body 1, are not insofar decisive as that the plate 6 can be slid to the right over the base 3, the plate 7 to the left under the load bearer 2. The loading of the load body 1 by the force to be measured then changes direction. The load body 1 comprises—as can be seen in FIG. 6—a cube. The load bearer 2, shown in the section AA in FIG. 2, has an axial longitudinal bore hole 8, which ends flat. The base 3 has similarly, as can be seen in FIG. 3 in the section BB, a longitudinal bore hole, which is performed as a coaxial hollow bore hole 10 with the longitudinal bore hole 8. The hollow bore hole 10 leaves a rod shaped element standing in its centre, a lever 11 and similarly ends flat.

The lengths of the bore holes 8 and 10 are together shorter than the overall length of the load body 1. This allows room for two identical milled notches 12, applied at right angles to the longitudinal axis of the load body 1 lying between the load bearer 2 and the base 3, which are here, for instance, produced essentially with right angles. Between the milled notches 12 and the outer surfaces of the load body 1, a flat element remains, which is designated as flexing spring 15, limited on the outside by the surface of the load body 1, and on the inside by the milled notches 12. Limited by the flat end of the longitudinal bore hole 8 and the hollow bore hole 10 and the milled notches 12, a membrane 16 arises, which is joined to the lever 11. The membrane 16 thereby serves as an elastic joint for the lever 11.

Figure 4:
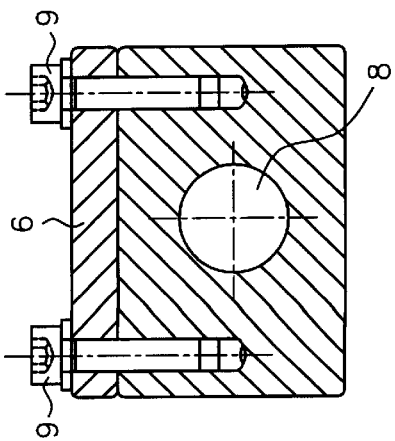

Perpendicular to the milled notches 12, two notches 32 run, joining them, whose depths perpendicular to the character level essentially correspond to that of the milled notches 12 (see FIG. 4).

In FIG. 4, which shows a cross-section CC through the load body 1 according to FIG. 1, the membrane 16 can be seen.

Figure 5:
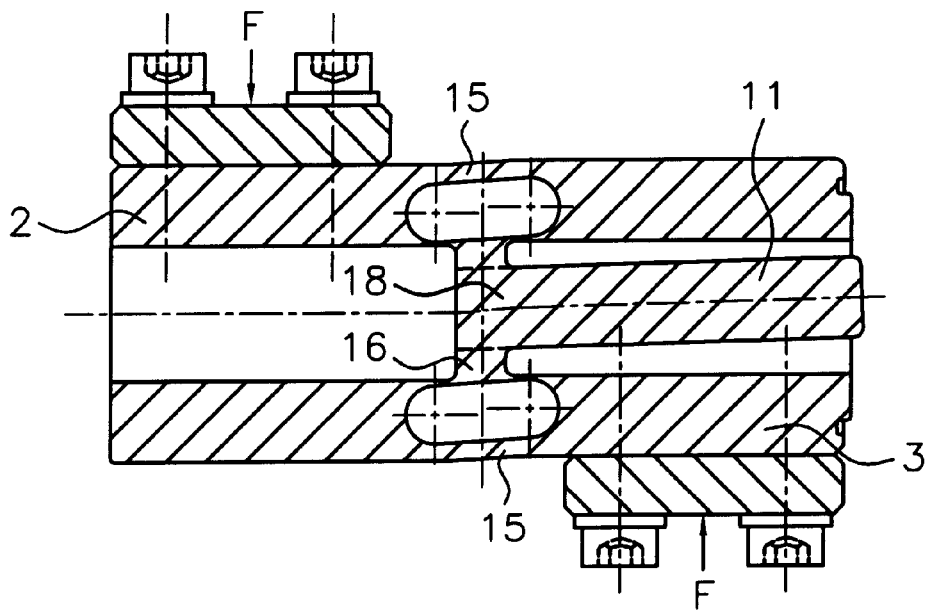

If the base 3 and the load bearer 2 are loaded in the direction given by the force arrow F in FIG. 1, then the flexing springs 15 bend in an S shape, and the lever 11 moves out upwards, as is shown greatly exaggerated in FIG. 5. The effective deformation is in fact much less, indeed of a virtual nature, since most measurement transducers, which are here considered, work practically without movement. In FIG. 5 the measurement transducer 4 and the associated electronics 5 are also omitted. The lever 11 thus reduces the force working on the load bearer 2, and the resulting torque conditions engaging with the membrane 16 and on a short section 18 of the lever 11, which lies between the limiting surfaces of the membrane 16, transmitted according to the length of the part 18 and that of the lever 11. If the elastic reduction has to be increased, then on the one hand the membrane 16 can be made thinner or on the other hand the flexing springs 15 can be produced with greater strength; obviously both measures are cumulative.

FIG. 6 is a longitudinal section through a second load body 1 according to the invention. Here the milled notches 12 are divided into a peripheral part 13 defining the flexing springs 15 and a central part 14, defining the short section 18 of the lever 11. In this way essentially two membranes 16, 17 come into existence, which are separated by the short section 18 of the lever 11. Further forms of construction are possible without departing from the concept of the invention, as long as the flexing springs 15 and the section 18 of the lever 11 lying between the membranes 16, 17 are defined by the milled notches 12, and the definition of the membranes 16, 17 arises from the longitudinal bore hole 8 and the hollow bore hole 10, coaxial with it, which at the same time defines the lever 11. The designations "bore hole 8", "hollow bore hole 10", "milled notch 12" are not to be understood as limited to the activities of boring and milling. Obviously other material removal techniques could be employed. Furthermore, the shaping can be undertaken also by other known processes, for example erosion machining, extrusion or casting, albeit followed by fine cutting machining.

The elastic deformation of the load body 1 in accordance with FIG. 6 occurs in an analog manner to that shown in FIG. 5.

Figure 7:
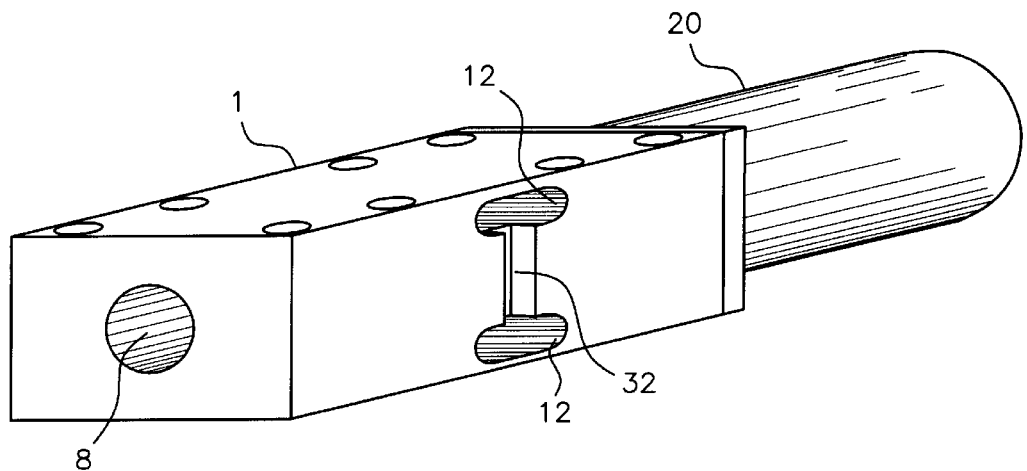
Figure 8:
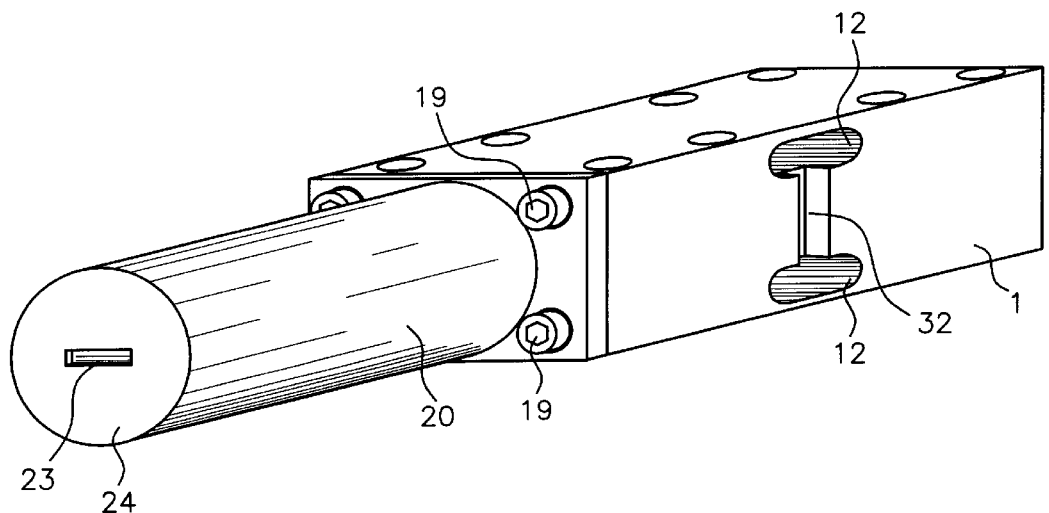
Figure 9:
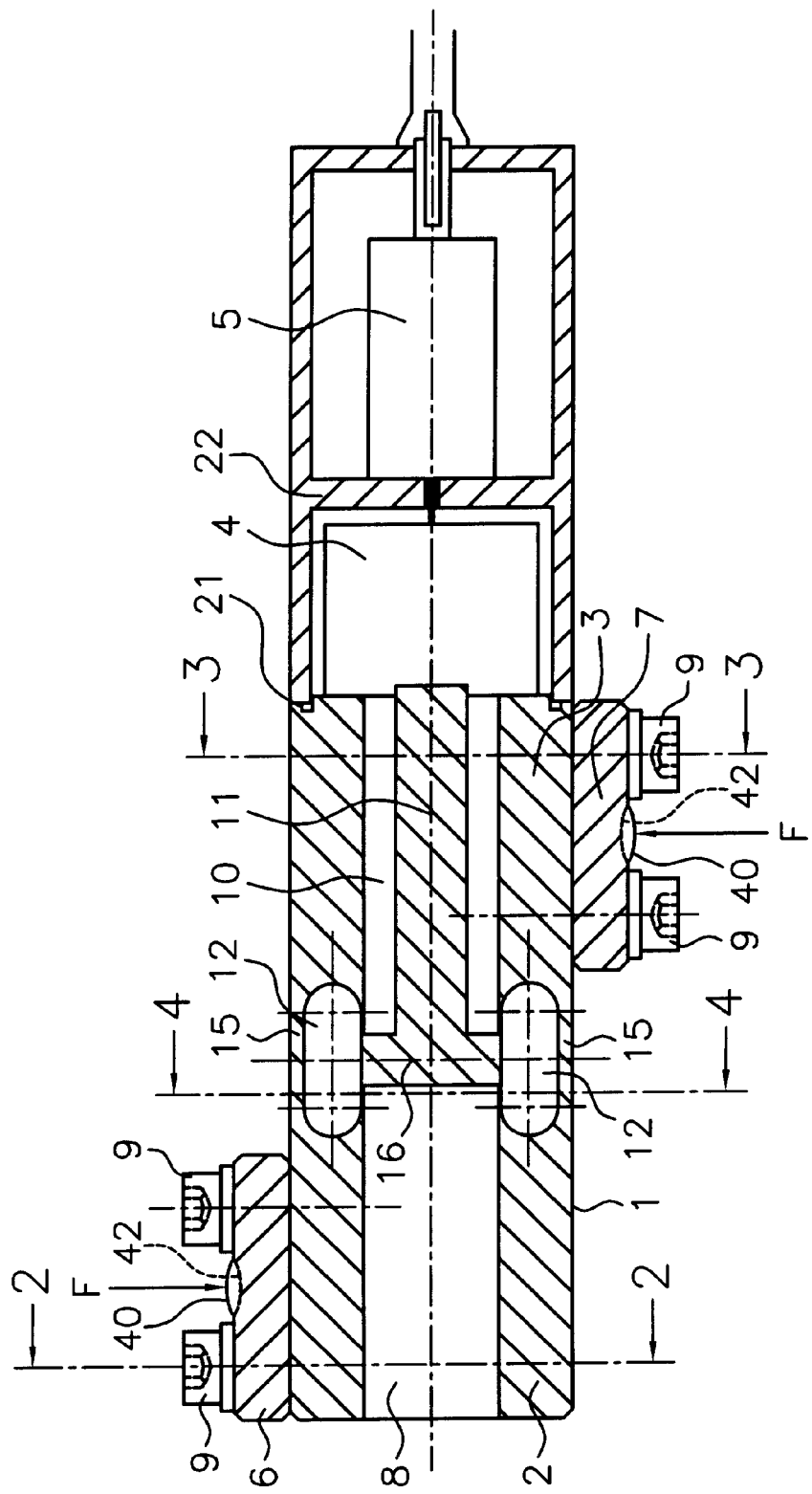

FIG. 7 and 8 show perspective views of the cuboid load body 1. A casing 20 is fastened, for instance by screws 19, to the load body 1. The casing 20 is sealed to the load body 1, for instance by an O-ring 21—shown in FIG. 1. The casing 20 has also an impervious wall 22 inside it, so that the measurement transducer 4 is encapsulated, water and gas tight. Its envelopment is thus bounded by the wall 22, the load body side of the casing 20, the wall of the hollow bore hole 10 and the membrane 17. The evaluation electronics 5 is positioned in the load body section of the casing 20, which is itself made tight.

In FIG. 7 and in the perspective representation of FIG. 8, which shows the force sensor from the other side than FIG. 7, the casing 20 is made cylindrical. Any other shape of casing, which accepts the measurement transducer 4 and the evaluation electronics, and has the tight wall 22 is obviously within the concept of the invention. The lid of the casing 20, which for instance can include a plug 23—here designated with the reference 24—can similarly be fastened with screws (not shown here) and sealed with an O-ring.

For the measurement transducer 4, all the practically non-moving constructions known today with suitable configuration can be considered, such as for example vibration galvanometers, foil strain gauges, piezoelectric, capacitative and refraction measurement transducers.

The monolithic force sensor according to the invention finds application wherever surface loads have to be determined, or the measurement task for the determination of a surface load can be reduced, and the plates 6, 7 are thereby also under torque loading apart from the forces shown in FIG. 1. Example for this are:

platform balances
belt conveyor scales
suspended beam scales

The invention can readily be extended further to the determination of point loads, wherein for instance the plate 6 is supplemented or replaced by a ball segment shaped surface. If both plates 6, 7 are supplemented by ball segment shaped surfaces, such that the ball segments are coaxially arranged, have essentially the same radius, which is greater than the half of the separation between the outermost points of the ball segments, then one obtains the wobble pin mentioned at the beginning.

The advantages of the force sensor according to the invention lie in its low height of construction, the gas and water tight construction of the measurement parts, simple manufacture and the fact that the method of construction does not a priori have an established measurement transducer.

What is claimed is:

1. A force sensor comprising:
   a load body having:
   (a) a first longitudinal bore hole extending coaxially with a longitudinal axis of said load body from a first end surface of said load body to a transverse wall in said load body extending transverse to the longitudinal axis of said load body,
   (b) a second longitudinal bore extending coaxially with the longitudinal axis of said load body from a second end surface of said load body to said transverse wall of said of load body,
   (c) a reduced wall thickness section in the longitudinal walls of said load body defined by first and second diametrically opposed notches in the longitudinal walls of said load body at said transverse wall of said load body dividing said load body into first and second parts and forming first and second flexing springs extending between said first and said second parts of said load body,
   (d) a core lever extending coaxially with the longitudinal axis of said load body through said second longitudinal bore hole from said transverse wall of said load body, and
   (e) first load receiving means on an outer surface of said first part of said load body and second load receiving means on a outer surface of said second part of said load body diametrically opposed from said first load receiving means for causing relative movement between said first and said second parts of said load body in response to a force to be measured applied to said first and said second load receiving means;

a casing attached to said second end surface of said load body;
   a measurement transducer fixed within said casing and attached to a free end of said core lever and responsive to relative movement of said first and said second parts of said load body for generating signals representative of relative movements between said first and said second parts of said load body; and
   evaluation electronics within said casing for processing signals from said measurement transducer and developing indications of forces applied to said first and said second load receiving means.

2. A force sensor according to claim 1 wherein said first load receiving means is between said notches and said first end surface of said load body and second load receiving means is between said notches and said second end surface of said load body.

3. A force sensor according to claim 2 wherein:
   (a) said load body is a rectangular box,
   (b) said notches extend across top and bottom walls of said load body between two side walls of said load body, and
   (c) said first load receiving means are on said top wall and said second load receiving means are on said bottom wall.

4. A force sensor according to claim 1 wherein said load body is a single piece part.

5. A force sensor according to claim 3 wherein said notches extend perpendicular to the longitudinal axis of said load body.

6. A force sensor according to claim 1 further including a fluid seal between said casing and said load body.

7. A force sensor according to claim 6 wherein said fluid seal is an O-ring.

8. A force sensor according to claim 1 wherein each of said first load receiving means and said second load receiving means include a ball segment shaped surface.

9. A force sensor according to claim 7 wherein the radius of each of said ball segment shaped faces is the same and is greater than half the distance separating the outermost points of said ball segment shaped surfaces.

10. A force sensor according to claim 9 herein said ball segment shaped surfaces are convex.

11. A force sensor according to claim 9 wherein said ball segment shaped surfaces are concave.

12. A force sensor according to claim 1 wherein said load body has a third notch extending perpendicular to the longitudinal axis of said load body between first ends of said first and said second diametrically opposed notches and a fourth notch extending perpendicular to the longitudinal axis of said load body between second ends of said first and said second diametrically opposed notches.

13. A force sensor according to claim 12 wherein each of said first and said second notches include:

(a) an extended peripheral section which, with an outer surface of said load body, defines one of said first and said second flexing springs, and
(b) a central section disposed towards the longitudinal axis of said load body and having a width corresponding to the width of said third and said fourth notches and forming two membranes extending from said peripheral section to said core lever.

* * * * *

UNITED STATES PATENT AND TRADEMARK OFFICE
CERTIFICATE OF CORRECTION

PATENT NO. : 6,216,542 B1  
DATED : April 17, 2001  
INVENTOR(S) : Stöckli et al.

Page 1 of 1

It is certified that error appears in the above-identified patent and that said Letters Patent is hereby corrected as shown below:

<u>Title page,</u>  
Item [56], References Cited, U.S. PATENT DOCUMENTS, delete "4,103,758" and insert -- 4,103,756 --.

<u>Column 4,</u>  
Line 52, delete "faces" and insert -- surfaces --.  
Line 55, delete "herein" and insert -- wherein --.

Signed and Sealed this

Twenty-second Day of January, 2002

*Attest:*

*Attesting Officer*

JAMES E. ROGAN  
*Director of the United States Patent and Trademark Office*